United States Patent
Lee et al.

(10) Patent No.: US 9,564,955 B2
(45) Date of Patent: Feb. 7, 2017

(54) METHOD AND APPARATUS FOR CANCELING INTERFERENCE SIGNAL OF UE IN WIRELESS COMMUNICATION SYSTEM

(71) Applicant: Samsung Electronics Co., Ltd., Gyeonggi-do (KR)

(72) Inventors: Heun-Chul Lee, Gyeonggi-do (KR); Jong-Han Lim, Seoul (KR)

(73) Assignee: Samsung Electronics Co., Ltd (KR)

( * ) Notice: Subject to any disclaimer, the term of this patent is extended or adjusted under 35 U.S.C. 154(b) by 0 days.

(21) Appl. No.: 14/844,820

(22) Filed: Sep. 3, 2015

(65) Prior Publication Data

US 2016/0065258 A1  Mar. 3, 2016

Related U.S. Application Data

(60) Provisional application No. 62/045,327, filed on Sep. 3, 2014.

(30) Foreign Application Priority Data

Feb. 11, 2015 (KR) .......... 10-2015-0021187
May 4, 2015 (KR) .......... 10-2015-0062482

(51) Int. Cl.
  *H03D 1/06*   (2006.01)
  *H04B 7/04*   (2006.01)
  *H04W 76/04*  (2009.01)
  *H04L 5/00*   (2006.01)
  *H04B 7/06*   (2006.01)
  *H04W 88/08*  (2009.01)

(52) U.S. Cl.
  CPC .......... *H04B 7/0456* (2013.01); *H04B 7/0413* (2013.01); *H04B 7/063* (2013.01); *H04B 7/0639* (2013.01); *H04L 5/00* (2013.01); *H04W 76/046* (2013.01); *H04W 88/08* (2013.01)

(58) Field of Classification Search
  CPC .............. H04L 27/2647; H04B 1/101027
  USPC ............................ 375/346, 316
  See application file for complete search history.

(56) References Cited

U.S. PATENT DOCUMENTS

| | | | |
|---|---|---|---|
| 8,787,483 B1* | 7/2014 | Sun ............ | H04L 1/02 375/267 |
| 8,995,503 B2* | 3/2015 | Kim ............ | H04B 7/024 375/219 |
| 2005/0180364 A1* | 8/2005 | Nagarajan ..... | H04K 3/228 370/335 |
| 2008/0123547 A1* | 5/2008 | Palanki ........ | H04L 25/0228 370/252 |

(Continued)

*Primary Examiner* — Helene Tayong
(74) *Attorney, Agent, or Firm* — The Farrell Law Firm, P.C.

(57) ABSTRACT

Methods and apparatuses are provided for canceling interference at a User Equipment (UE) in a wireless communication system. A signal that includes a desired signal and an interference signal is received from at least one Base Station (BS). A random parameter is generated by projecting a vector of the received signal onto a set of projection vectors. A decision metric is determined using the random parameter. A Traffic to Pilot Ratio (TPR) that minimizes the decision metric with respect to both a transmission mode candidate group of the interference signal and a TPR candidate group of the interference signal is determined. The interference signal is canceled from the received signal using the TPR.

18 Claims, 4 Drawing Sheets

(56) References Cited

U.S. PATENT DOCUMENTS

| | | | | |
|---|---|---|---|---|
| 2010/0278290 A1* | 11/2010 | Huang | ................ | H04L 27/2647 375/346 |
| 2012/0087265 A1* | 4/2012 | Tamaki | .................. | H01Q 1/246 370/252 |
| 2012/0087400 A1* | 4/2012 | Kim | ....................... | H04B 7/043 375/219 |
| 2012/0327795 A1* | 12/2012 | Mallik | ................. | H04B 17/345 370/252 |
| 2013/0114437 A1* | 5/2013 | Yoo | ........................ | H04J 11/005 370/252 |
| 2013/0114438 A1* | 5/2013 | Bhattad | ................. | H04J 11/005 370/252 |

\* cited by examiner

METHOD AND APPARATUS FOR CANCELING INTERFERENCE SIGNAL OF UE IN WIRELESS COMMUNICATION SYSTEM

PRIORITY

This application claims priority under 35 U.S.C. §119(e) to a U.S. Provisional Application No. 62/045,327, filed on Sep. 3, 2014 in the U.S. Patent and Trademark Office, and under 35 U.S.C. §119(a) to Korean Patent Application No. 10-2015-0021187 filed in the Korean Intellectual Property Office on Feb. 11, 2015 and Korean Patent Application No. 10-2015-0062482 filed in the Korean Intellectual Property Office on May 4, 2015, the disclosures of which are incorporated herein by reference.

BACKGROUND

1. Field of the Disclosure

The present disclosure relates generally to a technique for interference cancellation for a User Equipment (UE) in a wireless communication system, and more particularly, to a technique for canceling interference based on interference parameter blind detection of a subframe in which a traffic signal is transmitted in a Network-Assisted Interference Cancellation and Suppression (NAICS) scheme.

2. Description of the Related Art

To satisfy the strict requirements of the International Telecommunication Union Radio communication Sector (ITU-R), next-generation wireless networks such as, for example, Long Term Evolution (LTE)-Advanced (LTE-A), have been designed to support a broad bandwidth having a maximum of 100 MHz with higher-order spatial multiplexing and Carrier Aggregation (CA) up to 8 layer and 4 layer, respectively, in a DownLink (DL) and an UpLink (UL).

However, spatial frequency reuse using more cells provides a larger capacity gain than a cell having an increased spatial order or spectrum bandwidth. Thus, heterogeneous networks using small cells in a macro cell environment have emerged as the most practicable development path for next-generation wireless networks.

Although these heterogeneous networks may provide various advantages, they may cause unprecedented challenges to wireless networks. In particular, interference management, which is a matter of the utmost concern, may increase significantly. In this context, advanced co-channel interference aware signal detection has been researched in a recent development process for LTE-A systems. When cells are very densely disposed in heterogeneous networks, inter-cell interference becomes more serious, causing significant problems to the wireless networks.

Various attempts have been made to solve such problems.

An enhanced Inter-Cell Interference Coordination (eICIC) technique has been proposed to alleviate interference between macro cells for a UE that is located closer to small cells.

In addition, a concept of an Almost Blank Subframe (ABS) has been introduced as a Base Station (BS)-based interference alleviation method. When a BS indicates that a subframe is an ABS, a macro cell does not perform transmission in pilot signals. Specifically, a macro cell does not perform transmission in a DL data channel, that is, a Physical Downlink Shared Channel (PDSCH), except for a Cell-Specific Reference Signal (CRS), thus alleviating interference.

In addition, for a UE, a UE-based interference alleviation scheme using CRS sequence awareness is under consideration. A Further Enhanced Inter-Cell Interference Coordination (FeICIC) technique, which permits CRS Interference Cancellation (CRS-IC) by the UE, has been established in the LTE Release 11 of the 3rd-Generation Partnership Project (3GPP).

An NAICS technique has been studied by the 3GPP. Inclusion of a work item referred to as "NAICS" in the LTE Release 12 is under consideration. It has become obvious from studies that significant performance gain can be achieved on the assumption that interference parameters are known to a UE by broadcasting or dedicated signaling (for example, upper-layer signaling such as Radio Resource Control (RRC)) or the newly defined Downlink Control Information (DCI). However, the success of NAICS based on signaling depends on making interfering BSs use signaled parameters such as Rank Indicator (RI), Precoding Matrix Indicator (PMI), and Modulation Level (MOD), potentially limiting scheduling flexibility for neighboring cells. A back-haul capacity between BSs and a control channel capacity from the BS to the UE are generally limited, and support for an interference parameter is not maintained in actual systems at all times.

To overcome disadvantages such as a scheduling restriction of a cell and a network signaling overhead, the UE may estimate interference parameters from received signals as blind parameters. Joint Blind Detection (BD) of RI, PMI, and MOD may apply a Maximum Likelihood (ML) estimation including an exhaustive search among all possible combinations of RI, PMI, and MOD designated in the LTE systems. In LTE-Orthogonal Frequency Division Multiple Access (LTE-OFDMA) systems, assigned RI, PMI, and MOD may differ across simultaneously scheduled UEs from Transmission Time Interval (TTI) to TTI in a time domain and from Resource Block (RB) to RB in a frequency domain. Thus, joint BD would be required to be performed for every RB in every TTI in the LTE DL systems.

However, this assumption means that the interference parameters may dynamically change from one RB to another RB in the frequency domain in very TTI according to channel conditions, limiting scheduling performance and excessively increasing a network signaling load.

SUMMARY

An aspect of the present disclosure provides a method for canceling interference of a UE in a wireless communication system.

In accordance with an aspect of the present disclosure, a method is provided for canceling interference at a UE in a wireless communication system. A signal that includes a desired signal and an interference signal is received from at least one BS. A random parameter is generated by projecting a vector of the received signal onto a set of projection vectors. A decision metric is determined using the random parameter. A Traffic to Pilot Ratio (TPR) that minimizes the decision metric with respect to both a transmission mode candidate group of the interference signal and a TPR candidate group of the interference signal is determined. The interference signal is canceled from the received signal using the TPR.

In accordance with another aspect of the present disclosure, an apparatus is provided for canceling interference in a wireless communication system. The apparatus includes a controller configured to receive a signal including a desired signal and an interference signal from at least one BS, to generate a random parameter by projecting a vector of the received signal onto a set of projection vectors, to determine a decision metric using the random parameter, to determine a TPR that minimizes the decision metric with respect to both a transmission mode candidate group of the interference signal and a TPR candidate group of the interference signal, and to cancel the interference signal from the received signal using the detected TPR.

In accordance with another aspect of the present disclosure, a chip set is provided that is configured to receive a signal including a desired signal and an interference signal from at least one BS. The chip set is also configured to generate a random parameter by projecting a vector of the received signal onto a set of projection vectors, and determine a decision metric using the random parameter. The chip set is additionally configured to determine a TPR that minimizes the decision metric with respect to both a transmission mode candidate group of the interference signal and a TPR candidate group of the interference signal. The chip set is further configured to cancel the interference signal from the received signal using the TPR.

BRIEF DESCRIPTION OF THE DRAWINGS

The above and other aspects, features, and advantages of the present disclosure will be more apparent from the following detailed description when taken in conjunction with the accompanying drawings, in which.

DETAILED DESCRIPTION

Embodiments are described in detail with reference to the accompanying drawings. The same or similar components may be designated by the same or similar reference numerals although they are illustrated in different drawings. Detailed descriptions of constructions or processes known in the art may be omitted to avoid obscuring the subject matter of the present disclosure.

It is to be understood that the singular forms "a," "an," and "the" include plural referents as well, unless the context clearly dictates otherwise. Thus, for example, reference to "a component surface" includes reference to one or more of such surfaces.

By the term "substantially", it is meant that the recited characteristic, parameter, or value need not be achieved exactly, but that deviations or variations, including for example, tolerances, measurement error, measurement accuracy limitations, and other factors known to those of skill in the art, may occur in amounts that do not preclude the effect the characteristic was intended to provide.

It should be understood that the term "include" or "has", as used herein, indicates the presence of features, numbers, steps, operations, elements, parts, or a combination thereof described in the specifications, and does not preclude the presence or addition of one or more other features, numbers, steps, operations, elements, parts, or a combination thereof.

The term "or" or "at least one of A and B", as used herein, includes any and all combinations of the associated listed items. For example, the term "A or B" or "at least one of A and B" may include A, B, or both of A and B.

Although terms such as "first" and "second", as used herein, may modify various elements of the various embodiments, these terms do not limit the corresponding elements. For example, these terms do not limit an order and/or importance of the corresponding elements. These terms may be used for the purpose of distinguishing one element from another element. For example, a first user device and a second user device both indicate user devices and may indicate different user devices. Additionally, a first element may be referred to as a second element without departing from the scope of the various embodiments of the present disclosure, and similarly, a second element may be referred to as a first element.

It will be understood that when an element is "connected" or "coupled" to another element, the element may be directly connected or coupled to the other element, or there may be another element between the element and the other element. To the contrary, it will be understood that when an element is "directly connected" or "directly coupled" to another element, there is no other element between the element and the other element.

All of the terms used herein, including technical or scientific terms, have the same meanings as those generally understood by an ordinary skilled person in the related art unless they are defined otherwise. The terms defined in a generally used dictionary should be interpreted as having the same meanings as the contextual meanings of the relevant technology and should not be interpreted as having ideal or exaggerated meanings unless they are clearly defined in the embodiments of the present disclosure.

A need arises to solve interference issues of LTE DL normal subframes including traffic signals as well as pilot signals (for example, CRS).

Another aspect of the present disclosure is to provide interference cancellation techniques based on blind-detected NAICS interference parameters.

Another aspect of the present disclosure is to provide blind detection methods for estimating a Traffic-to-Pilot Ratio (TPR) to be used by a BS that causes interference to solve interference issues regarding Long Term Evolution (LTE) DownLink (DL) subframes including traffic signals.

Another aspect of the present disclosure is to provide a detection method which achieves low complexity in interference TPR estimation and has little loss in a Block Error Rate (BLER) when compared to a case where an actual TPR is given.

Another aspect of the present disclosure is to provide a method for estimating a TPR by jointly classifying interference transmission modes in which information may be obtained through projections of a received signal as a set of Grassmannian vectors.

Another aspect of the present disclosure is to provide a scheme for implementing a blind estimator for detecting if Physical Downlink Shared Channels (PDSCHs) causing interference exist in a given Resource Block (RB) pair.

A BS is an entity communicating with a UE and may be referred to as a BS, a NodeB (NB), an eNodeB (eNB), an Access Point (AP), or the like.

The UE is an entity communicating with a BS and may be referred to as a UE, a Mobile Station (MS), a Mobile Equipment (ME), a device, a terminal, or the like.

FeICIC focuses on pilot signals, that is, a CRS. Since CRS Interference Cancellation (IC) merely requires static interference parameters, that is, a physical Cell Identity (CID), CRS antenna ports, and a Multimedia Broadcast Multicast Service over Single Frequency Network (MBSFN) subframe configuration, the signaling overhead enabling FeICIC is at a manageable level.

Unlike FeICIC, NAICS addresses interference in a data channel known as a PDSCH and may require knowledge of at least one dynamic interference parameter, including, for example, a UE-specific Traffic-to-Pilot Ratio (TPR), an RI, a PMI, and a MOD. That is, the UE may perform interference cancellation on the assumption that at least one of the interference parameters, including TPR, RI, PMI, and MOD, are known to the UE through support for network signaling.

Also in NAICS, similar approaches for supporting RRC signaling, mainly for static interference parameters, have been negotiated.

Table 1 shows interference parameters negotiated by RRC signaling in NAICS.

Figure 1:
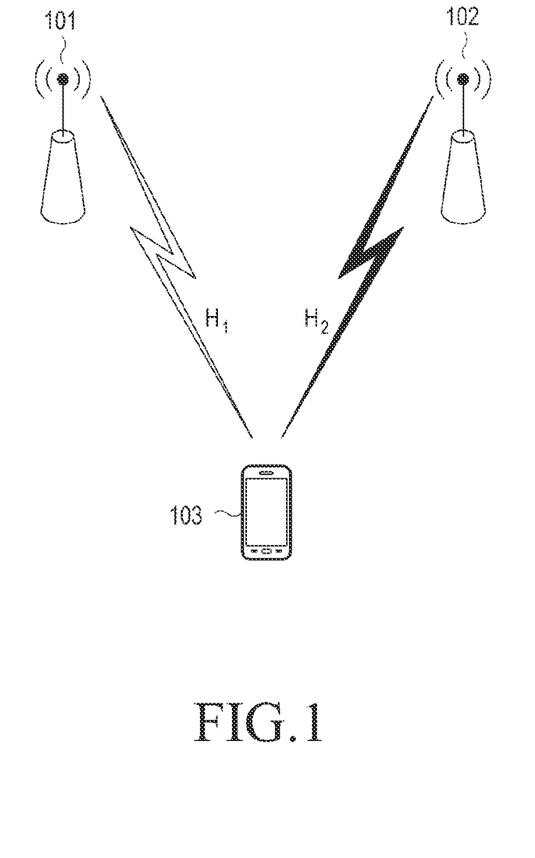
FIG. 1 is a diagram illustrating a Multiple-Input Multiple-Output (MIMO)-OFDM system formed by two BSs and a UE.

In FIG. 1, a DL MIMO-OFDM system is illustrated in which a first BS 101 and a second BS 102, having $N_t$ transmission antennas mounted thereon, transmit their messages to a desired UE 103, having $N_r$ reception antennas mounted thereon. A transmission channel may be embodied as at least one of, for example, a PDSCH and a Physical Multicast Channel (PMCH).

In NAICS studies, it is assumed that for a normal Cyclic Prefix (CP), a unit-set of RI, PMI, and MOD is assigned to an RB pair including 12 consecutive subcarriers in one TTI corresponding to fourteen OFDM symbol intervals. Thus, BD and data detection may be performed in a unit of the RB pair including 168 (=14*12) Resource Elements (REs).

An $l_i$-dimensional complex signal vector transmitted from a BS i in a $k^{th}$ RE is expressed as $x_k^i = [x_k^{i,1}, \ldots, x_k^{i,l_i}]^T$. Here, $x_k^{i,l}$ indicates an $l^{th}$ special layer, $l_i$ represents the number of transmission layers (that is, RI), and $(\Box)^T$ represents a transpose of a vector. The symbol $x_k^{i,l}$ is selected from a constellation set $C^{i,l}$ whose cardinality is expressed as $|C^{i,l}|$. An average transmission power of $x_k^{i,l}$ is given as $E[|x_k^{i,l}|^2] = \sigma_i^2$. Herein, $E[\Box]$ represents an expectation operator, and $|\Box|$ represents an absolute value of a complex number. Without losing generality, it is assumed that "BS i=S" represents a serving BS and "BS i=I" represents an interfering BS.

TABLE 1

| Interference Parameter | Description | Range |
| --- | --- | --- |
| Physical Cell ID | Physical cell ID (up to 8 neighboring cells) | {0, 1, . . . , 503} |
| CRS Port Number | Antenna port for CRS | {1, 2, 4} |
| Transmission Mode (TM) | Supported transmission mode | {1, 2, 3, 4, 6, 8, 9, 10} |
| MBSFN Setting | Subframe set in MBSFN | Following 3GPP TS 36.331 definition |
| RB Density | Resource allocation and precoding density | {1, 2, 3, 4} |
| $P_b$ | Cell-specific TPR | {0, 1, 2, 3} |
| Subset of $P_a$ | 3 candidate values for UE-specific TPR | {−6, −4.77, −3, −1.77, 0, 1, 2, 3} |

To reduce detection complexity and improve detection performance, a subset of three candidate values for a UE-specific TPR, as shown in Table 1, may be signaled.

According to an embodiment to the present disclosure, the UE removes the effect of other interference transmission modes from a received signal power by inverting the effect of a channel matrix, and performs BD of the TPR based on received signal observations. According to another embodiment of the present disclosure, the UE jointly classifies the interference transmission modes based on a difference in the received signal power to perform BD of the TPR. In particular, the UE projects the received signal vectors onto a set of Grassmannian vectors and uses a difference in projected power between different interference transmission modes to estimate an interference TPR.

According to embodiments of the present disclosure, the TPR detection method operates as a blind estimator for detecting whether or not a PDSCH causing interference is in a given RB pair.

In describing a system model and an enhanced LTE demodulator, it is assumed that the UE is already aware of NAICS interference parameters, that is, TPR, RI, PMI, and MOD.

FIG. 1 illustrates a MIMO-OFDM system formed by two BSs and a UE.

Herein, $r_k$ is defined as a signal vector received in the desired UE 103 in RE k. $r_k$ may be expressed as follows in Equation (1):

$$r_k = H_k^S x_k^S + H_k^I x_k^I + n_k, \text{ for } k=1,2,\ldots,K, \quad (1),$$

where $H_k^i$ represents an effective channel matrix including actual channel matrix and a precoding matrix, represents an additive noise vector having independent and identically-distributed (i.i.d.) complex Gaussian elements of a dispersion $\sigma_n^2$, and K represents the number of coded REs (especially, subcarriers) used in each RB pair.

An Interference Rejection Combiner (IRC) demodulator is provided as a baseline LTE receiver. The IRC may suppress inter-cell interference as well as inter-stream interference in a spatial multiplexing transmission. A weight matrix for the IRC may be expressed as set forth below in Equation (2):

$$W_k = (H_k^S)^T R_k^{-1}, \quad (2),$$

where $(\Box)^+$ represents a Hermitian operation, and a covariance matrix $R_k$ including a desired signal, an undesired signal, and noise vectors may be expressed as set forth below in Equation (3).

$$R_k = \sigma_S^2 H_k^S (H_k^S)^\dagger + R^{I+N}. \quad (3)$$

Since a CRS sequence of a serving cell is known to a UE, an Interference-plus-Noise (I+N) covariance matrix $R^{I+N}$ is estimated by averaging elements of interference and noise vectors in serving Cell-specific Reference Signal-Resource Elements (CRS-REs). The I+N covariance matrix $R^{I+N}$ is set forth below in Equation (4):

$$R_k^{I+N} = \frac{1}{K_{crs}} \sum_{k=1}^{K_{crs}} (r_k - H_k^S S_k^S), \quad (4)$$

where $K_{crs}$ represents the number of serving CRS-REs for each RB pair and $S_k^S$ represents a transmission vector corresponding to a CRS sequence of a serving cell.

Since the interference-plus-covariance matrix may be directly evaluated by the serving CRS-REs, the baseline IRC receiver may not need prior knowledge of an interference transmission mode.

Unlike a baseline LTE receiver, advanced NAICS receivers may use information about interference that improves MIMO performance, that is, interference channel matrix and interference parameters. Thus, embodiments of the present disclosure generalize a model of Equation (1) using terms of the known interference information and provide a description of two advanced NAICS receivers (that is, NAICS IRC and NAICS ML) based on enhanced IRC and ML demodulations.

Herein, a channel model from BS i to a desired UE in RE k is defined as $N_r \times N_t$ channel matrix $G_k^i$. An (m,n) entry of $G_k^i$ represents a path gain from an antenna n of BS i to an antenna m of a UE. Entries may be modeled with independent complex Gaussian random parameters having a zero mean and a unit variance, that is, Rayleigh fading. $P_k^i$ represents a $N_t \times l_i$ precoding matrix (or vector) used by BS i in RE k.

Table 2 shows candidate RI, precoding matrices (or vectors), and MOD for each transmission mode, assuming MIMO LTE systems having two transmission antennas.

TABLE 2

| TM | RI(l) | PMI (p) | MOD (q) |
|---|---|---|---|
| 2 | 2 | $\frac{1}{\sqrt{2}}\begin{bmatrix} 1 & 0 \\ 0 & 1 \end{bmatrix}$ | {4, 4}, {16, 16} |
| 3 | 2 | $\frac{1}{2}\begin{bmatrix} 1 & 1 \\ 1 & -1 \end{bmatrix}, \frac{1}{2}\begin{bmatrix} 1 & 1 \\ -1 & 1 \end{bmatrix}$ | {4, 4}, {16, 16} |
| 4 | 2 | $\frac{1}{2}\begin{bmatrix} 1 & 1 \\ 1 & -1 \end{bmatrix}, \frac{1}{2}\begin{bmatrix} 1 & 1 \\ -j & j \end{bmatrix}$ | {4, 4}, {16, 16} {16, 4}, {16, 16} |
| 4/6 | 1 | $\frac{1}{\sqrt{2}}\begin{bmatrix} 1 \\ \exp(j\frac{k\pi}{2}) \end{bmatrix}, k = 0, 1, 2, 3$ | 4, 16 |

The UE may calculate an effective channel of interference, $H_k^i$, as a product of the precoding matrix $P_k^i$ and the channel matrix $G_k^i$. Thus, by an expression $H_k^i = G_k^i P_k^i$, Equation (1) may be re-written as shown below in Equation (5).

$$r_k = H_k^S x_k^S + G_k^I P_k^I x_k^I + n_k \quad (5)$$

An enhanced IRC (that is, NAICS IRC) defined in NAICS studies uses knowledge of interference RI and PMI to obtain $P_k^I$, and calculates a corresponding weight matrix using the Equation (6), set forth below.

$$W_k = (H_k^S)^t (\sigma_S^2 (H_k^S)^t + \sigma_I^2 G_k^I P_k^I (G_k^I P_k^I)^t + \sigma_n^2 I)^{-1} \quad (6)$$

When compared to the NAICS IRC, the NAICS ML requires additional knowledge of MOD as well as interference RI and PMI. The NAICS ML may sufficiently implement the advantage of NAICS characteristics by considering non-linear interference cancellation.

In the NAICS ML, from the definition of the NAICS, soft bit information for serving data $x_k^S = [x_k^{S,1}, \ldots, x_k^{S,l_S}]^T$ is required. Herein, an m bit of a constellation symbol $x_k^{S,l}$ (m=1, 2, ..., $\log_2|C^{S,l}|$) is expressed as $b_{k.l.m}^S$. A Log Likelihood Ratio (LLR) value $L(b_{k.l.m}^S)$ for the bit $b_{k.l.m}^S$ is expressed as set forth in Equation (7) below:

$$L(b_{k,l,m}^S) = \log \frac{P(b_{k,l,m}^S = 1)}{P(b_{k,l,m}^S = 0)}, \quad (7)$$

where $P(b_{k.l.m}^S = b)$ represents a probability of the random parameter $b_{k.l.m}^S$ having a value of b (b=0 or 1).

A conditional Probability Density Function (PDF) of $r_k$ having conditions of $x_k^S$ and $x_k^I$ may be expressed as set forth below in Equation (8).

$$p(r_k | x_k^S, x_k^I) = \frac{1}{(\pi \sigma_n^2)^{N_r}} \exp\left( \frac{-\|r_k - H_k^S x_k^S - G_k^I P_k^I x_k^I\|^2}{\sigma_n^2} \right), \quad (8)$$

where an LLR value of $b_{k.l.m}^S$ is given by Equation (9) below:

$$L(b_{k,l,m}^S) = \log \frac{\sum_{x_k^S} \in x_{(1,l,m)}^S \sum_{x_k^I} \in x^I p(r_k|x_k^S, x_k^I)}{\sum_{x_k^S} \in x_{(0,l,m)}^S \sum_{x_k^I} \in x^I p(r_k|x_k^S, x_k^I)}, \quad (9)$$

where $x^i$ represents a set of all possible symbol vectors $x_k^i$ obtained as an $l_i$-fold Cartesian product of $C^{i,l}$, $x_{[b.l.m]|}^S$ represents a subset of $X^S$ in which $b_{k.l.m}^S = b$ (b=0 or 1), and the operator $[|\bullet|]$ represents an Euclidean norm. In Equation (8), $$\frac{1}{(\pi \sigma_n^2)^{N_r}}$$

is a constant, and thus, will not be considered in the remainder of the disclosure.

Referring to Equation (9), it can be seen that an NAICS ML-based demodulator has the highest complexity among the foregoing LTE demodulators. Negotiation between performance and complexity may be achieved by applying max-log approximation to Equation (9). By applying max-log approximation, a minimum Euclidean Distance (ED)-based LLR calculation, such as that of Equation (10) below, may be possible.

$$L(b_{k,l,m}^S) = \min_{x_k^S \in \mathcal{X}_{[0,l,m]}^S, x_k^I \in \mathcal{X}^I} \frac{\|r_k - H_k^S x_k^S - G_k^I P_k^I \times x_k^I\|^2}{\sigma_n^2} - \min_{x_k^S \in \mathcal{X}_{[1,l,m]}^S, x_k^I \in \mathcal{X}^I} \frac{\|r_k - H_k^S x_k^S - G_k^I P_k^I \times x_k^I\|^2}{\sigma_n^2}. \quad (10)$$

A method for detecting a TPR, according to an embodiment of the present disclosure, is described below in which it is assumed that the UE is not aware of NAICS interference parameters, that is, TPR, RI, PMI, and MOD.

As described above, in LTE DL subframes including traffic signals, unlike an ABS scheme, consideration of an interference issue caused by traffic is required. Thus, consideration of the TPR contributes to an improvement in the performance of interference cancellation.

Embodiments of the present disclosure provide a description of BD methods for estimating an interference TPR based on received signal observations.

In LTE systems, a CRS is used for channel estimation from a BS by a UE. When channel matrices estimated by the UE for a serving BS and an interfering BS are $G_{crs,k}^S$ and $G_{crs,k}^I$, a signal vector received in a $k^{th}$ data RE may be explicitly expressed as set forth in Equation (11) below.

$$r_k = \sqrt{\rho_S} G_{crs,k}^S P_k^S x_k^S + \sqrt{\rho_I} G_{crs,k}^I P_{crs,k}^I x_{crs,k}^I + n_k \quad (11),$$

where for i=S or i=I, $\rho_i$ represents a ratio of a CRS RE transmission power to a data RE transmission power (that is, a TPR).

The TPR $\rho_i$ may be given as a function of two TPR-related parameters indicated by $P_a$ and $P_b$ according to data RE positions by referring to an OFDM index in each TTI. As shown in Table 1, an accurate value of a static cell-specific parameter $P_b$ is available to the UE through RRC signaling, whereas a dynamic UE-specific parameter $P_a$ needs to be detected from the three signaled candidate values.

An expectation of a received signal power may be expressed as set forth below in Equation (12).

$$E[\|r_k\|^2] = \rho_S \sigma_S^2 \|G_{crs,k}^S P_k^S\|_f^2 + \rho_I \sigma_I^2 \|G_{crs,k}^I P_k^I\|_f^2 + N_r \sigma_n^2 \quad (12),$$

where $\|\cdot\|_f$ represents a Frobenius norm of a matrix (or a vector). Equation (12) shows that the expectation of the received signal power is a function of an interference precoding matrix (or vector) $P_k^I$.

As can be seen from Equation (12), information in $\rho_S$ and $P_k^S$ (not in $\rho_I$ and $P_k^I$) is provided to the UE through network signaling, such that BD of $\rho_I$ based on the received signal power requires knowledge of $P_k^I$.

According to an embodiment the present disclosure, $\rho_I$ is estimated by using a pseudo-inverse matrix of an interference channel matrix. To overcome a difficulty in BD of $\rho_I$ requiring knowledge of $P_k^I$, a pseudo-inverse matrix of an interference channel matrix expressed by Z (that is, a matrix obtained by $G_{crs,k}^I = I_{N_r}$) is applied to the received signal vector and $\rho_I$ is estimated by using a unit-norm property of the precoding matrix $P_k^I$ satisfying $E[\|P_k^I\|_f^2]=1$.

Application of the channel-inverse matrix Z to the received signal vector may be expressed as set forth below in Equation (13).

$$Zr_k = \sqrt{\rho_S} ZG_{crs,k}^S P_k^S x_k^S + \sqrt{\rho_I} P_k^I x_k^I + Zn_k \quad (13)$$

By using a Frobenius norm, a power expectation for Equation (13) may be obtained as set forth below in Equation (14).

$$E[\|Zr_k\|^2] = \rho_S \sigma_S^2 \|ZG_{crs,k}^S P_k^S\|_f^2 + \rho_I \sigma_I^2 + \sigma_n^2 \|Z\|_f^2 \quad (14)$$

In calculating Equation (14), the characteristic of $E[\|P_k^I\|_f^2]=1$ is used.

By re-writing Equation (14) as Equation (15), an estimate value $\hat{\rho}_I$ of $\rho_I$ may be obtained by averaging observations from received signal vectors with respect to K REs.

$$\hat{\rho}_I = \frac{1}{K} \sum_{k=1}^{K} \left( \frac{\|Zr_k\|^2 - \rho_S \sigma_S^2 \|ZG_{crs,k}^S P_k^S\|_f^2 - \sigma_n^2 \|Z\|_f^2}{\sigma_I^2} \right) \quad (15)$$

According to another embodiment of the present disclosure, Pi is estimated by classifying interference transmission modes.

The embodiment of the present disclosure described above removes the effects of other transmission modes from the average received signal power by inverting the effects of channel matrices by using the pseudo-inverse matrix and unit-normal characteristics of the LTE precoding matrices. The embodiment of the present invention described below classifies the transmission modes according to a norm of a resulting composite channel matrix and performs metric comparison between the transmission modes to determine an optimal TPR.

As shown in Table 2, all of the CRS-based transmission modes indicated for LTE systems may be classified into the following five TM groups, that is, a first group $g_1$ (TM2, TM3, and TM4), a second group $g_2$ (TM6 having PMI=0), a third group $g_3$ (TM6 having PMI=1), a fourth group $g_4$ (TM6 having PMI=2), and a fifth group $g_5$ (TM6 having PMI=3), depending on a squared norm value of a corresponding composite channel matrix (that is, $\|G_{crs,k}^I P_k^I\|_f^2$ of Equation (12)). This embodiment of the present disclosure uses, for estimation of $\rho_I$, a fact that the different TM groups have different norm values.

As shown in Table 2, in the transmission modes (that is, TM2, TM3, TM4) belonging to the first group $g_1$, the precoding matrix $P_k^I$ is a unitary matrix scaled by $\sqrt{2}$ to meet a power constraint, thus having the same squared norm as $\|G_{crs,k}^I P_k^I\|_f^2 = \frac{1}{2} \|G_{crs,k}^I\|_f^2$ regardless of $P_k^I$. In comparison with this, for the other TM groups $\{g_2, g_3, g_4, g_5\}$, the squared norm of $\|G_{crs,k}^I P_k^I\|_f^2$ remains as a function of $P_k^I$, and $\|G_{crs,k}^I P_k^I\|_f^2$ is also known as a beamforming gain that actually depends on an angle between two subspaces spanning by row vectors of $G_{crs,k}^I$ and $P_k^I$ in an $N_r$-dimensional complex vector space $\mathbb{C}^{N_r}$.

If the TM group determined by $P_k^I$ is known to the UE, this $\rho_I$ detection problem may be simple and solved. For example, the $\rho_I$ detection problem may be solved by using a Maximum Ratio Combining (MRC) vector for a resulting channel matrix $G_{crs,k}^I P_k^I$ that is optimal for maximization of a ratio of a desired signal power to a residual signal-plus-noise power.

Unfortunately, herein, the foregoing assumption (that is, the assumption that the TM group determined by $P_k^I$ is known to the UE) is not applied. Thus, the terminal and the TM group $g_1$ (I=1, . . . , 5) jointly estimate Pi.

The remaining problem is how to identify a group to which an interfering TM belongs. According to an embodiment of the present disclosure, TM group classification may be performed by projecting a received signal vector onto M projection vectors $p_m$ (m=1, M). Herein, m represents an index of a projection vector. Information about the composite channel matrix $G_{crs,k}^I P_k^I \in \mathbb{C}^{N_r}$ may be obtained as projections of the received signal vector onto a set of the M projection vectors. For example, the projections of the received signal vector onto the M projection vectors may be expressed as an inner product of the projection vector and the received signal vector. A projection of the received signal vector $r_k$ onto the projection vector $p_m$ may be expressed as a random parameter $p_{m,k}$ as given by Equation (16) below.

$$p_{m,k} = p_m r_k \qquad (16)$$
$$= \sqrt{\rho_S}\, p_m G^S_{crs,k} P^S_k x^S_k + \sqrt{\rho_I}\, p_m G^I_{crs,k} P^I_k x^I_k + p_m n_k$$

In an i.i.d. MIMO Rayleigh fading scenario, column vectors of a resulting composite channel matrix $G_{crs,k}^I P_k^I$ may be assumed to be uniformly distributed in $\mathbb{C}^{N_r}$. Thus, a set of Grassmannian vectors are used as the projection vector $p_m$. The Grassmannian vector may have a size of 1 bit, 2 bits, or 3 bits. In addition, assuming that elements $\chi_k^S$ and $\chi_k^I$ are independent, and are Gaussian distributed by a zero average and variances of $\sigma_S^2$ and $\sigma_I^2$, and channel realizations and precoding matrices are given, the random parameter $p_{m,k}$ may have a zero average (that is, $E[p_{m,k}]=0$) and may have a Gaussian distribution of variances as expressed below in Equation (17).

$$\mathrm{VAR}[p_{m,k}] = \rho_S \sigma_S^2 \|p_m G^S_{crs,k} P^S_k\|^2 + \rho_I \sigma_I^2 \|p_m G_{crs,k}^I P_k^I\|^2 + \sigma_n^2 \|p_m\|^2 \qquad (17)$$

A sum of squares of K independent Gaussian parameters $\chi_k^S$ and $\chi_k^I$ having a zero average and a unit variance is known as a chi-square random parameter having a degree of freedom, K. If a sum of squares of random parameters is expressed as Equation (16), $\chi_m$, is defined as Equation (18), $\chi_m$ follows a chi-square distribution having the degree of freedom, K.

$$\chi_m = \sum_{k=1}^{K} \frac{|p_{m,k}|^2}{\mathrm{VAR}[p_{m,k}]} \qquad (18)$$

One of the basic characteristics of the chi-square distribution is that an average of the chi-square distribution is equal to a degree of freedom, and a variance of the chi-square distribution is double the degree of freedom. Thus, the average and variance of the chi-square distribution may be expressed as shown in Equation (19) and Equation (20).

$$E[\chi_m] = K \qquad (19)$$

$$\mathrm{VAR}[\chi_m] = 2K \qquad (20)$$

As the number of samples, K, increases according to a central limit theorem, $\chi_m$ tends to follow a Gaussian distribution. Thus, the distribution of $\chi_m$ may be expressed as shown in Equation (21).

$$\frac{1}{\sqrt{2\pi \times 2K}} \exp\left(\frac{-(\chi_m - K)^2}{2 \times 2K}\right) \qquad (21)$$

Unlike the embodiment using Equation (15), this embodiment of the present disclosure explicitly considers $P_k^I$ as shown in Equation (16) and Equation (17), and $P_k^I$ eventually determines a TM group $g_i$. A probability of an interference TPR being $\rho_I$ for the TM group $g_i$, that is, a probability of $[(\rho)]\,I.g\,Ii$), P, may be obtained by considering a total of M projections as expressed in Equation (22).

$$P(\rho_I, g_i) = \prod_{m=1}^{M} \frac{1}{\sqrt{2\pi \times 2K}} \exp\left(\frac{-(\chi_m - K)^2}{2 \times 2K}\right) \qquad (22)$$

To obtain a low-complexity decision metric, logarithms of Equation (22) are taken and constant norms are removed, thus defining the TPR decision metric, as expressed in Equation (23).

$$\mathcal{M}(\rho_I, g_i) = \sum_{m=1}^{M} (\chi_m - K)^2 \qquad (23)$$

where $M[\rho]_{I}, g_i)$ is a decision metric for determining an interference TPR $\rho_I$ for the TM group $g_i$.

By finding a value that minimizes the decision metric, as in Equation (24), an estimate $\widehat{\rho_I}$ of the interference TPR (i.e., a TPR of interference signal) may be detected.

$$\hat{\rho}_I = \min_{\rho_I \in S_{\rho_I}, g_i \text{ for } i \in \{1,\ldots,5\}} \mathcal{M}(\rho_I, g_i) \qquad (24)$$

where $S_{\rho_I}$ represents a set of possible TPRs. For example, $S_{\rho_I}$ may be obtained through information signaled from a BS. As described above, the 3GPP has agreed that candidate $P_a$ and $P_b$ to be used in neighboring cells may be signaled to the UE through RRC signaling. The signaling may not only improve TPR detection performance of the UE, but may also reduce the complexity of TPR detection. More specifically, a set of corresponding TPRs indicated by $S_{\rho_I}^{RRC}$ is obtained as a function of the parameters $P_a$ and $P_b$ signaled (for example, RRC signaled) to the UE, and may be used for $S_{\rho_I}$ of Equation (24) (that is, $S_{\rho_I} = S_{\rho_I}^{RRC}$). For example, if there are three candidates for Pi and five candidates for $g_i$, then an estimate $\widehat{\rho_I}$ may be determined through a comparison among a total of 3*5=15 candidates.

In addition, a proposed TPR detection method may operate as a blind estimator for detecting whether there is a PDSCH interfering with a given RB pair. In particular, absence of the PDSCH may be indicated by $\rho_I=0$. Thus, by using a set of candidate transmission power ratios, $S_{\rho_I} = \{0 S_{\rho_I}^{RRC}\}$, detection of interfering PDSCHs, together with TPR blind detection may be performed. For example, if a result of TPR estimation using the set of candidate transmission power ratios, $\widehat{\rho_I}$, is 0, then the UE may determine that there is no PDSCH interfering with the given RB pair.

Figure 2:
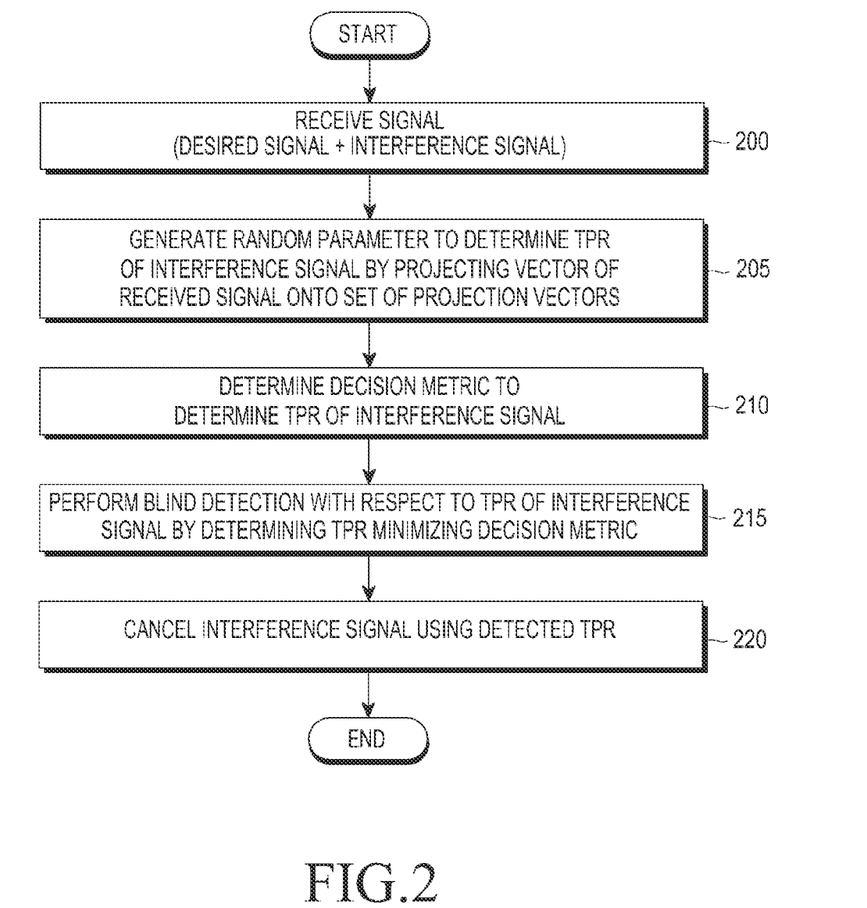
FIG. 2 is a flowchart illustrating a method for canceling an interference signal by detecting a TPR of the interference signal at the UE, according to an embodiment the present disclosure.

FIG. 2 is a flowchart illustrating a method for canceling an interference signal by detecting a TPR of the interference signal at the UE, according to an embodiment of the present disclosure.

Specifically, FIG. 2 illustrates a method of the later embodiment of the present disclosure described above.

The UE receives a signal including a desired signal and an interference signal from at least one BSs using a transceiver (for example, a Radio Frequency (RF) chip), in step 200. The transceiver of the UE may operate according to MIMO spatial multiplexing transmission and may perform signal transmission and reception by using multiple antennas.

The UE (for example, a controller (such as a modem chip)) projects a vector of the received signal onto a set of M projection vectors to generate a random parameter $p_{m,k}$ for determining a TPR of the interference signal, in step 205. The projection vector may be a Grassmannian vector having a size of $2^1$, $2^2$, or $2^3$.

The UE determines a decision metric for TPR determination of the interference signal by using the random parameter, in step 210. More specifically, the UE may determine the decision metric by taking logarithms of a TPR probability function P of the interference signal expressed as a sum of squares of the random parameter, $\chi_m$. For example, the TPR probability function may be expressed as Equation (22) and the decision metric may be expressed as Equation (23).

The UE performs BD with respect to a TPR of the interference signal by determining the TPR that minimizes the decision metric for both a transmission mode candidate group of the interference signal and a TPR candidate group of the interference signal, in step 215. For example, detection of the TPR that minimizes the decision metric may be expressed as Equation (24). The transmission mode candidate group of the interference signal may include the aforementioned five TM groups. The TPR candidate group of the interference signal may be defined by at least one of a cell-specific TPR parameter $P_b$ and a UE-specific TPR parameter $P_a$, which are signaled through an RRC message. Selectively, the TPR candidate group of the interference signal may include 0 as an element, and if 0 is detected as the TPR of the interference signal, the UE may determine that there is no interfering PDSCH in a corresponding RB pair.

The UE removes the interference signal from the received signal by using the detected TPR, in step 220.

Figure 3:
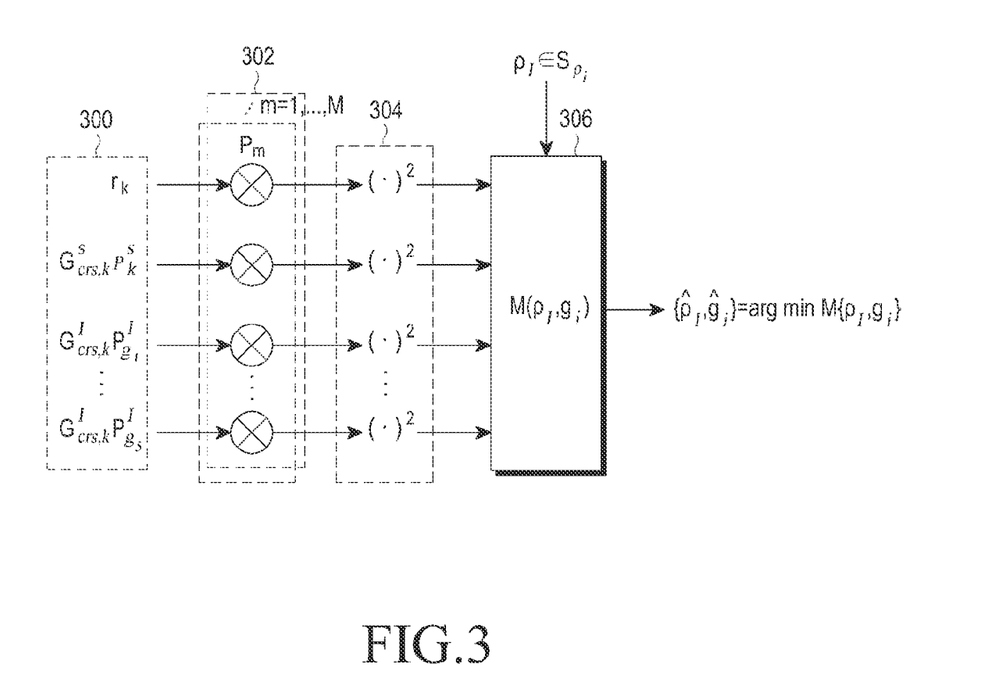
FIG. 3 is a diagram illustrating a method of jointly estimating an interference transmission mode and a TPR, according to an embodiment of the present disclosure.

FIG. 3 is a diagram illustrating a method for jointly estimating an interference transmission mode and a TPR, according to an embodiment of the present disclosure.

A vector 300 of a received signal includes a desired signal component ru, undesired signal components $(G_{crs,k}^S P_k^S)$ from a serving cell, and undesired signal components $(G_{crs,k}^I P_k^I)$ from an interfering cell. For an interference cell from the interfering cell, transmission mode groups $g_1, \ldots, g_5$ are taken into consideration.

The UE takes an inner product of the vector 300 of the received signal with a set 302 of projection vectors $p_m$ (m=1, ... M), and calculates a sum 304 of squares of a result of the inner product.

The UE determines a decision metric $M[(\rho)_I, g_i]$ 306 by using the sum of the squares 304, and determines $\widehat{\rho_I}$ minimizing the decision metric 306 as a TPR of the interference signal. The UE may receive candidates of the TPR to determine $\widehat{\rho_I}$ minimizing the decision metric 306.

Selectively, the UE may further perform BD to determine an RI value of the interference signal, l, a PMI value of the interference signal, p, and a MOD value of the interference signal, q. The UE may remove the interference signal by further using the values l, p, and q.

Figure 4:
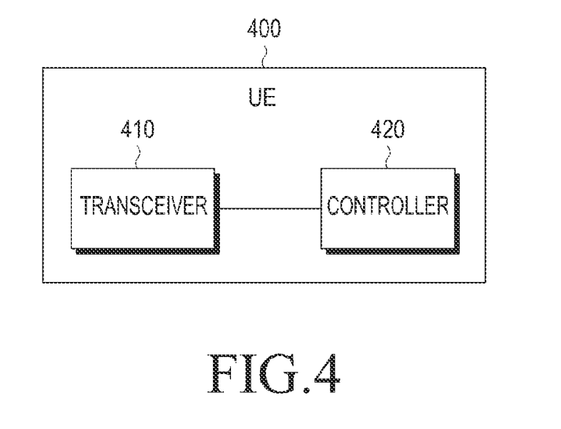
FIG. 4 is a block diagram illustrating a structure of a UE device, according to an embodiment of the present disclosure.

FIG. 4 is a block diagram illustrating a structure of a UE device, according to an embodiment the present disclosure.

A UE apparatus 400 includes a transceiver 410 configured to communicate a signal with a BS or another UE, and a controller 420 configured to control the transceiver 410. The transceiver 410 may be implemented with a device such as an RF chip, and the controller 420 may be implemented with a device such as a modem chip. However, the transceiver 410 and the controller 420 may be implemented with one device (that is, a single chip).

The controller 420 implements a method for canceling interference of the UE described in the present disclosure.

That is, the above-described operations of the UE may be understood as being performed by the controller 420. The controller 420 may include an internal or external memory 420.

It is to be appreciated that the controller is intended to include any processing device, such as, for example, one that includes a central processing unit (CPU) and/or other processing circuitry. It is also to be understood that the term "controller" may refer to more than one processing device and that various elements associated with a processing device may be shared by other processing devices.

The term "memory", as used herein, is intended to include memory associated with a controller or CPU, such as, for example, random access memory (RAM), read only memory (ROM), a fixed memory device (e.g., hard drive), a removable memory device (e.g., diskette), flash memory, etc.

The transceiver 410 performs signal transmission and reception and uses multiple antennas for spatial multiplexing transmission.

The structure of the UE may also be implemented with input/output (I/O) devices and a network interface, coupled to the controller, transceiver, and/or memory via a computer bus or alternate connection arrangement.

The phrase "network interface", as used herein, is intended to include, for example, one or more transceivers to permit the computer system to communicate with another computer system via an appropriate communications protocol.

Figure 5:
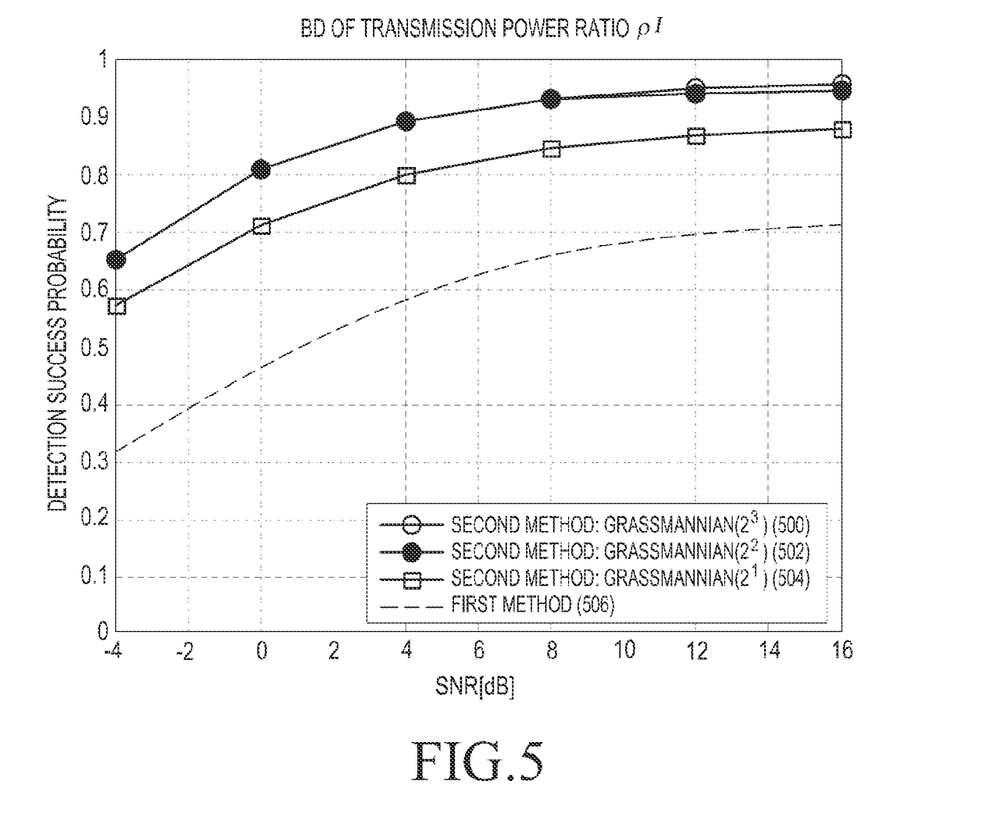
FIG. 5 is a graph showing a detection success probability between TPR estimation methods, according to embodiments of the present disclosure.

FIG. 5 is a graph showing a Monte Carlo simulation result showing a detection success probability between TPR estimation methods, according to embodiments of the present disclosure.

FIG. 5 shows results of an embodiment of the present disclosure that is based on channel inversion indicated by graph 506, and results of an embodiment of the present disclosure with respect to a size of an applied Grassmannian set indicated by graphs 500-504. That is, a result of using a Grassmannian vector set having a size of $2^3$, a result of using a Grassmannian vector set having a size of $2^2$, and a result of using a Grassmannian vector set having a size of $2^1$ are indicated by graphs 500, 502, and 504, respectively. As shown, the results 500, 502, and 504 with respect to a size of an applied Grassmannian set obtain a substantial gain when compared to the results based on channel inversion 506. Further, most gains are obtained by applying a Grassmannian vector set having a size of $2^2=4$ (that is, a size of 2 bits), as indicated by 502.

In addition, TPR detection with respect to a size of an applied Grassmannian set causes degradation only at an insignificant level in terms of Block Error Rate (BLER) performance when compared to a case where an actual TPR is known to the UE. For example, assuming a target BLER of 10%, TPR detection according with respect to a size of an applied Grassmannian set maintains a performance loss of 0.2 dB or lower. For reference, TPR detection with respect to channel inversion may undergo a performance loss of a maximum of 1.0 dB.

Advanced NAICS receivers based on interference parameters that are blindly detected by applying embodiments of the present disclosure may significantly improve the performance of the LTE-A UE in interference-restricted wireless environments.

Embodiments of the present disclosure describe a new TPR detection method including applying Grassmannian projection vectors to the received signal and determining an optimal TPR using comparison between other interference transmission modes.

Advanced NAICS receivers based on BD may be promising candidates for UE devices having additional high performance and low complexity.

The above described operations may be implemented by providing a memory device storing a corresponding program code to an entity of a communication system, a function, or a specific structural element of the UE. That is, the entity, the function, the BS, or the controller of the UE carries out the above described operations by reading and executing the program code stored in the memory device by means of a processor or a Central Processing Unit (CPU).

The entity, the function, the BS, or various structural elements of the UE (for example, the modem chip and the RF chip), modules, and the like may be operated by using a hardware circuit, for example, a complementary metal oxide semiconductor (CMOS)-based logic circuit, firmware, software, and/or a combination of hardware and the firmware and/or software embedded in a machine readable medium. For example, various electric configurations and methods may be carried out by using electric circuits such as transistors, logic gates, and an Application Specific Integrated Circuit (ASIC).

The embodiments may be utilized in conjunction with the manufacture of integrated circuits, systems on chips, or chip sets. In general, a plurality of identical dies are typically formed in a repeated pattern on a surface of a semiconductor wafer. Each die may include other structures or circuits. The individual die are cut or diced from the wafer, then packaged as an integrated circuit. One skilled in the art would know how to dice wafers and package die to produce integrated circuits. Integrated circuits so manufactured are considered part of this disclosure.

The TPR estimation method according to the present disclosure guarantees a high detection success rate with low computation complexity and provides BLER performance that is similar with a case where the TPR is actually signaled to the UE.

While embodiments have been shown and described herein, it will be understood by those skilled in the art that various changes in form and detail may be made therein without departing from the spirit and scope of the invention as defined by the appended claims.

What is claimed is:

1. A method for canceling interference at a User Equipment (UE) in a wireless communication system, the method comprising:
receiving a signal comprising a desired signal and an interference signal from at least one Base Station (BS) using a transceiver;
generating a random parameter by projecting a vector of the received signal onto a set of projection vectors;
determining a decision metric using the random parameter;
determining a Traffic to Pilot Ratio (TPR) that minimizes the decision metric with respect to both a transmission mode candidate group of the interference signal and a TPR candidate group of the interference signal; and
canceling the interference signal from the received signal using the determined TPR,
wherein the transmission mode candidate group of the interference signal comprises a first group comprising a Transmission Mode (TM) 2, a TM 3, and a TM 4 of a Long Term Evolution (LTE) system, a second group comprising a TM 6 having a Precoding Matrix Indicator (PMI)=0, a third group comprising a TM 6 having a PMI=1, a fourth group comprising a TM 6 having a PMI=2, and a fifth group having a TM 6 having a PMI=3.

2. The method of claim 1, wherein each projection vector of the set of projection vectors is a Grassmannian vector and a size of the set of the projection vectors is one of 2, 4, and 8.

3. The method of claim 1, wherein determining the decision metric comprises:
taking logarithms of a TPR probability function of the interference signal expressed as a sum of squares of the random parameter to determine the decision metric.

4. The method of claim 1, wherein the TPR candidate group of the interference signal is defined by at least one of a cell-specific TPR parameter and a UE-specific TPR parameter that are signaled through a Radio Resource Control (RRC) message.

5. The method of claim 1, wherein:
the TPR candidate group of the interference signal further comprises 0 as an element, and
when 0 is detected as the TPR, the UE determines that an interfering Physical Downlink Shared Channel (PDSCH) does not exist in a corresponding Resource Block (RB) pair.

6. The method of claim 1, wherein the signal is received through at least one of a Physical Downlink Shared Channel (PDSCH) and a Physical Multicast Channel (PMCH).

7. The method of claim 1, wherein the decision metric is expressed as:

$$\mathcal{M}(\rho_I \cdot g_i) = \sum_{m=1}^{M} (\chi_m - K)^2,$$

where M represents size of a set of projection vectors, $\rho_I$ represents the TPR, $g_i$ represents a transmission mode candidate group of an $i^{th}$ interference signal, $\chi_m$ represents a term of a sum of squares of the random parameter, and K represents the number of Resource Elements (REs) in a corresponding Resource Block (RB) pair.

8. The method of claim 1, further comprising:
detecting a Rank Indicator (RI) value of the interference signal, a Precoding Matrix Indicator (PMI) value of the interference signal, and a Modulation level (MOD) value of the interference signal,
wherein the canceling of the interference signal is performed by using the RI value, the PMI value, and the MOD value.

9. The method of claim 1, wherein the UE uses multiple antennas for transmission and reception in a Multiple-Input Multiple-Output (MIMO) link.

10. An apparatus for canceling interference in a wireless communication system, the apparatus comprising:
a transceiver configured to receive a signal comprising a desired signal and an interference signal from at least one Base Station (BS); and
a controller configured to generate a random parameter by projecting a vector of the received signal onto a set of projection vectors, to determine a decision metric using the random parameter, to determine a Traffic to Pilot Ratio (TPR) that minimizes the decision metric with respect to both a transmission mode candidate group of the interference signal and a TPR candidate group of the interference signal, and to cancel the interference signal from the received signal using the determined TPR, wherein the transmission mode candidate group of the interference signal comprises a first group comprising a Transmission Mode (TM) 2, a TM 3, and a TM 4 of a Long Term Evolution (LTE) system, a second group comprising a TM 6 having a Precoding Matrix Indicator (PMI)=0, a third group comprising a TM 6 having a PMI=1, a fourth group comprising a TM 6 having a PMI=2, and a fifth group having a TM 6 having a PMI=3.

11. The apparatus of claim 10, wherein each projection vector of the set of projection vectors is a Grassmannian vector and a size of the set of the projection vectors is one of 2, 4, and 8.

12. The apparatus of claim 10, wherein the controller is further configured to take logarithms of a TPR probability function of the interference signal expressed as a sum of squares of the random parameter to determine the decision metric.

13. The apparatus of claim 10, wherein the TPR candidate group of the interference signal is defined by at least one of a cell-specific TPR parameter and a UE-specific TPR parameter that are signaled through a Radio Resource Control (RRC) message.

14. The apparatus of claim 10, wherein:
the TPR candidate group of the interference signal further comprises 0 as an element, and when 0 is detected as the TPR, the controller determines that an interfering Physical Downlink Shared Channel (PDSCH) does not exist in a corresponding Resource Block (RB) pair.

15. The apparatus of claim 10, wherein the transceiver is further configured to receive the signal under control of the controller, and wherein the transceiver receives the signal through at least one of a Physical Downlink Shared Channel (PDSCH) and a Physical Multicast Channel (PMCH).

16. The apparatus of claim 10, wherein the decision metric is expressed as:

$$\mathcal{M}(\rho_I, g_i) = \sum_{m=1}^{M} (\chi_m - K)^2,$$

where M represents size of a set of projection vectors, $\rho_I$ represents the TPR, $g_i$ represents a transmission mode candidate group of an $i^{th}$ interference signal, $\chi_m$ represents a term of a sum of squares of the random parameter, and K represents the number of Resource Elements (REs) in a corresponding Resource Block (RB) pair.

17. The apparatus of claim 10, wherein the controller is further configured to detects a Rank Indicator (RI) value of the interference signal, a Precoding Matrix Indicator (PMI) value of the interference signal, and a Modulation level (MOD) value of the interference signal, and to cancel the interference signal by using the RI value, the PMI value, and the MOD value.

18. A chip set including a transceiver and a controller,
the transceiver configured to receive a signal comprising a desired signal and an interference signal from at least one Base Station (BS); and
the controller configured to:
generate a random parameter by projecting a vector of the received signal onto a set of projection vectors;
determine a decision metric using the random parameter;
determine a Traffic to Pilot Ratio (TPR) that minimizes the decision metric with respect to both a transmission mode candidate group of the interference signal and a TPR candidate group of the interference signal; and
cancel the interference signal from the received signal using the determined TPR,
wherein the transmission mode candidate group of the interference signal comprises a first group comprising a Transmission Mode (TM) 2, a TM3, and a TM 4 of a Long Term Evolution (LTE) system, a second group comprising a TM 6 having a Precoding Matrix Indicator (PMI)=0, a third group comprising a TM 6 having a PMI=1, a fourth group comprising a TM 6 having a PMI=2, and a fifth group having a TM 6 having a PMI=3.

* * * * *